US012427513B2

(12) United States Patent
Ratzka

(10) Patent No.: US 12,427,513 B2
(45) Date of Patent: Sep. 30, 2025

(54) AIR CUSHION PIPETTE

(71) Applicant: Eppendorf SE, Hamburg (DE)

(72) Inventor: Andreas Ratzka, Hamburg (DE)

(73) Assignee: Eppendorf SE, Hamburg (DE)

( * ) Notice: Subject to any disclaimer, the term of this patent is extended or adjusted under 35 U.S.C. 154(b) by 323 days.

(21) Appl. No.: 18/118,814

(22) Filed: Mar. 8, 2023

(65) Prior Publication Data

US 2023/0285955 A1 Sep. 14, 2023

(30) Foreign Application Priority Data

Mar. 9, 2022 (DE) ..................... 10 2022 105 534.5

(51) Int. Cl.
*B01L 3/02* (2006.01)

(52) U.S. Cl.
CPC ........... *B01L 3/0224* (2013.01); *B01L 3/0227* (2013.01); *B01L 3/0279* (2013.01); *B01L 2200/0689* (2013.01); *B01L 2300/042* (2013.01); *B01L 2300/0803* (2013.01); *B01L 2300/0861* (2013.01)

(58) Field of Classification Search
CPC .... B01L 3/0224; B01L 3/0227; B01L 3/0279; B01L 2200/0689; B01L 2300/042; B01L 2300/0803; B01L 2300/0861; B01L 3/0217; B01L 2400/0415; B01L 2400/0478
USPC ................. 73/864.18, 864.71; 422/501, 516; 436/180
See application file for complete search history.

(56) References Cited

U.S. PATENT DOCUMENTS 11,084,030 B2 8/2021 Dudek et al.
2009/0000350 A1 1/2009 Magnussen et al.

OTHER PUBLICATIONS

EP 22216513; filed Dec. 23, 2022; European Search Report dated Jul. 18, 2023 (5 pages).
EP 22216513; filed Dec. 23, 2022; English translation of European Search Report dated Jul. 18, 2023 (6 pages).

*Primary Examiner* — Robert R Raevis
(74) *Attorney, Agent, or Firm* — Barclay Damon LLP

(57) ABSTRACT

An air cushion pipette comprises at least one seat configured to releasably hold a pipette tip and a displacement apparatus comprising a displacement chamber including a displacement element configured to be displaced therein. A drive apparatus is coupled to the displacement element and configured to displace the displacement element in the displacement chamber. An overstroke apparatus comprises a lower stop and is configured such that a stop element displaces the lower stop downwards when the stop element presses against the lower stop, wherein the downward displacement of the lower stop is limited to a first overstroke. A displaceable overstroke limiting element is configured to enable the displacement of the lower stop downwards by the first overstroke in a release position and limit said displacement to a second overstroke that is shorter than the first overstroke in a blocking position.

15 Claims, 6 Drawing Sheets

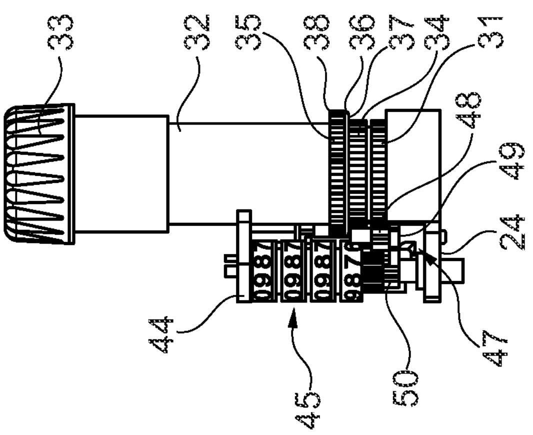
Fig. 3.1
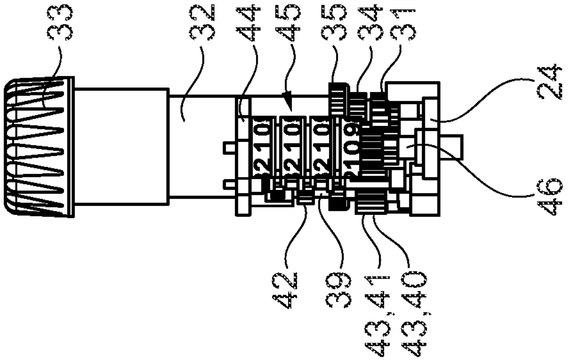
Fig. 3.2
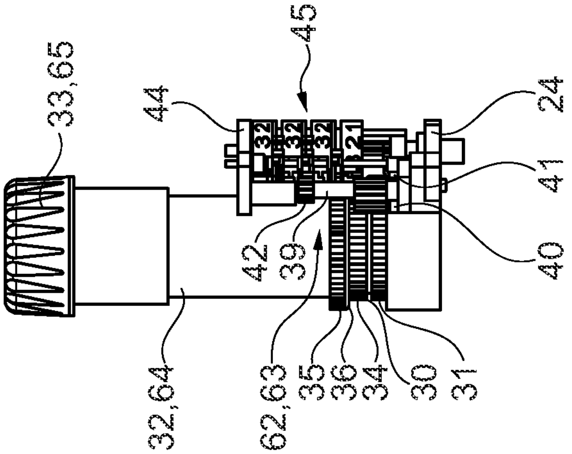
Fig. 3.3
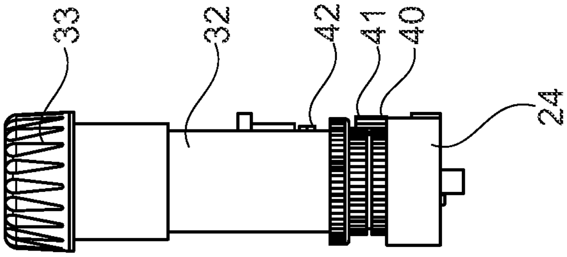
Fig. 3.4

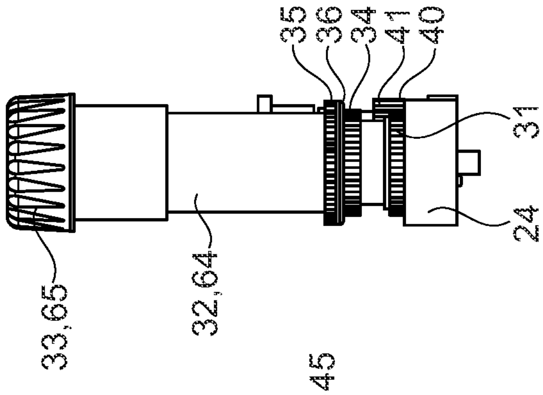
Fig. 4.4
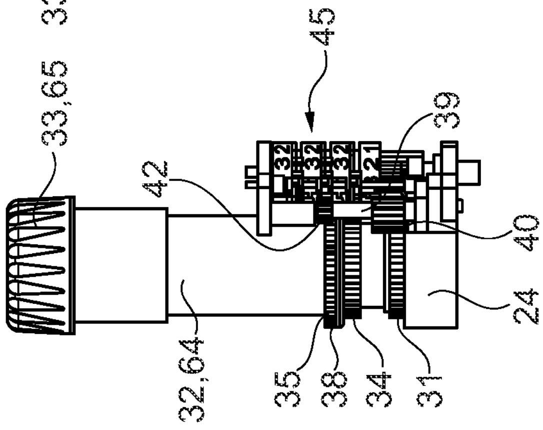
Fig. 4.3
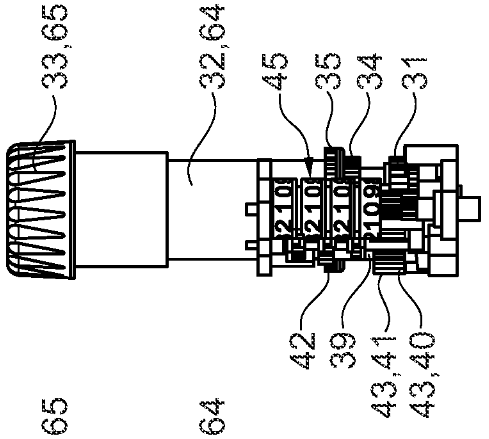
Fig. 4.2
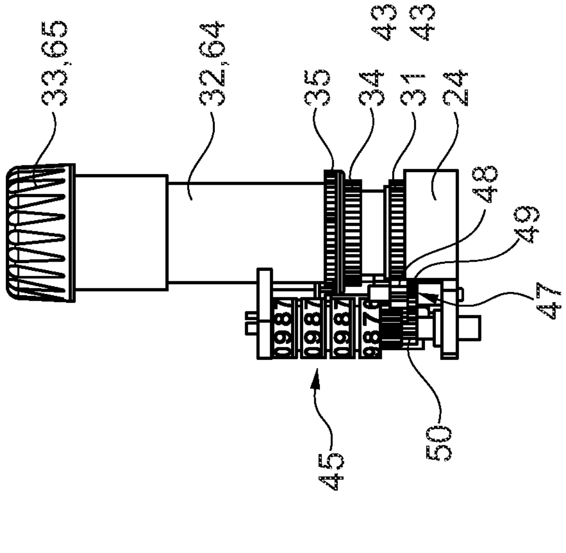
Fig. 4.1

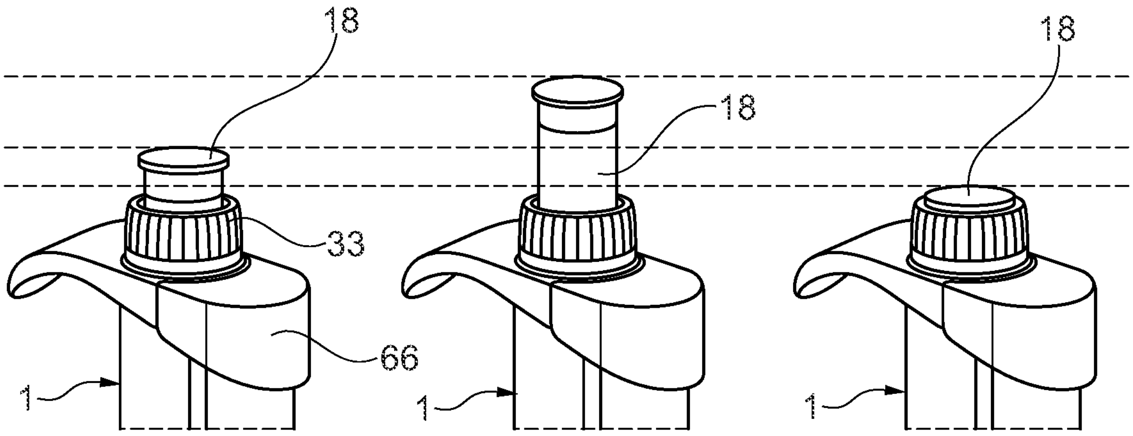
Fig. 5.1 Fig. 5.2 Fig. 5.3
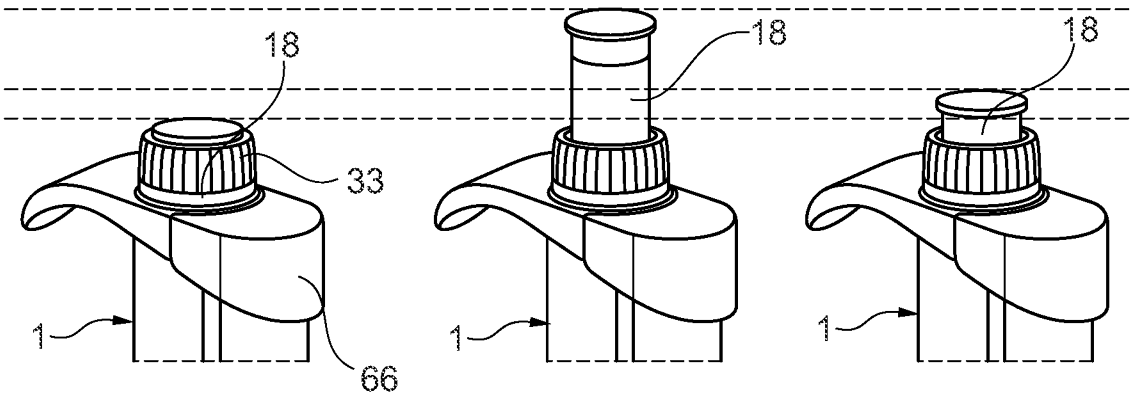
Fig. 6.1 Fig.6.2 Fig. 6.3

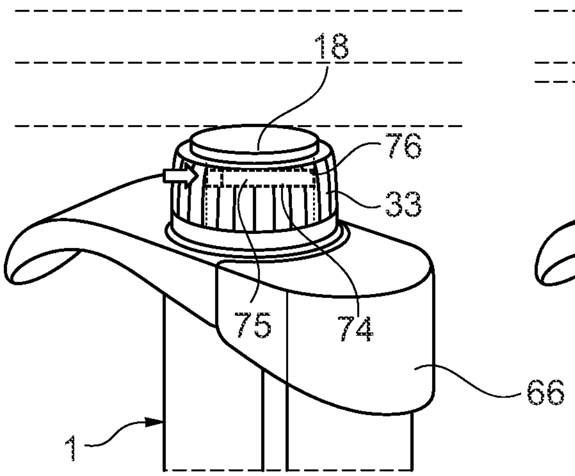
Fig. 7.1
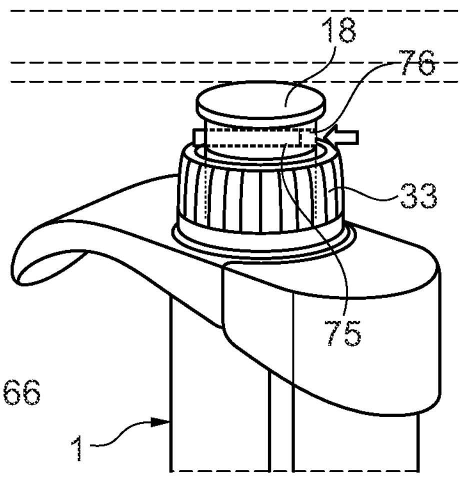
Fig. 7.2
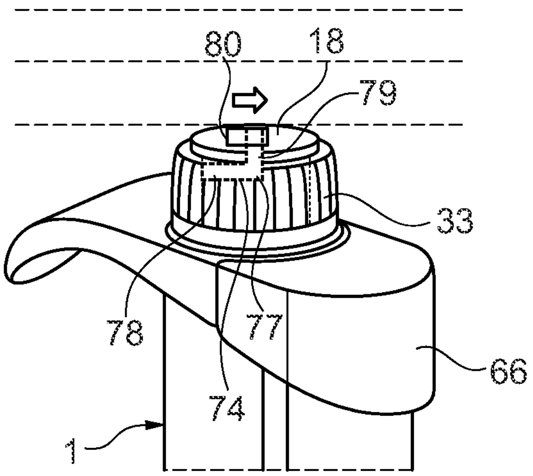
Fig. 8.1
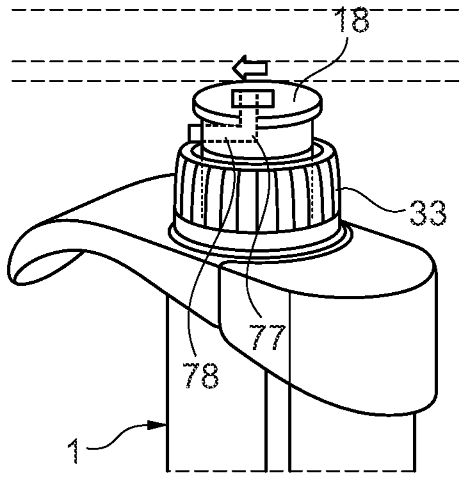
Fig.8.2
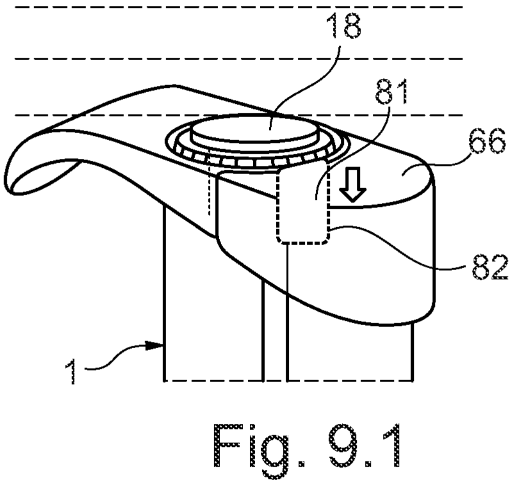
Fig. 9.1
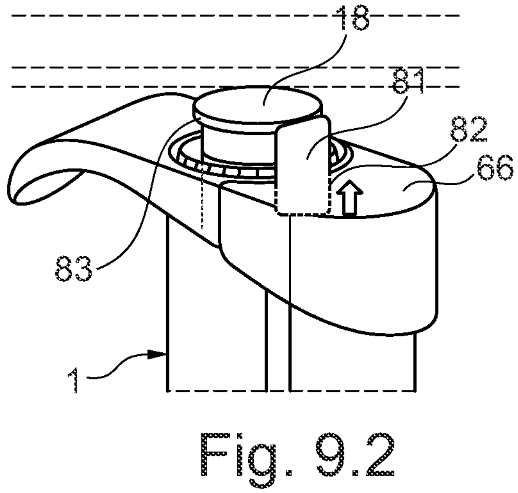
Fig. 9.2

AIR CUSHION PIPETTE

CROSS REFERENCE TO RELATED INVENTION

This application is based upon and claims priority to, under relevant sections of 35 U.S.C. § 119, German Patent Application No. 10 2022 105 534.5, filed Mar. 9, 2022, the entire contents of which are hereby incorporated by reference.

TECHNOLOGICAL FIELD

The invention relates to an air cushion pipette comprising at least one pipette tip.

BACKGROUND

Air cushion pipettes are used, in particular, in laboratories for metering liquids. For this purpose, a pipette tip comprising an upper opening is securely clamped onto a seat of the pipette. The seat is generally a conical and/or cylindrical projection at the lower end of a housing of the pipette onto which a pipette tip can be clamped by an upper opening of its tubular body. The pipette tip can take up and discharge liquid through a lower opening of its downwardly tapering body. Air cushion pipettes comprise a displacement apparatus for air which is connected so as to communicate with the pipette tip through an opening in the seat. An air cushion is displaced by means of the displacement apparatus in order to draw liquid into the pipette tip and expel it therefrom. For this purpose, the displacement apparatus has a displacement chamber comprising a displacement element that can be displaced therein. The displacement apparatus is usually a cylinder comprising a plunger that can be displaced therein.

After use, the pipette tip is detached from the seat and exchanged for a fresh pipette tip. As a result, contamination due to the transfer of liquid can be prevented during subsequent metering procedures. Pipettes often comprise an ejection apparatus which make it possible to eject pipette tips by means of the actuation of a button without the pipette tips being gripped. Pipette tips for single use often consist of plastic material.

The displacement element is coupled to a drive apparatus which serves to displace the displacement element in the displacement chamber. In the case of known, manually driven pipettes, the drive apparatus comprises a stroke rod which can be moved with a stop element between an upper and a lower stop. Before air is pushed out of the cylinder, the stop element rests against the upper stop. By displacing the stroke rod downwards such that the stop element comes to rest against the lower stop, air is pushed out of the cylinder. When displacing the stroke rod upwards such that the stop element comes to rest against the upper stop, air is drawn into the cylinder and sample liquid is drawn into the pipette tip. By displacing the stroke rod downwards again, the liquid is dispensed from the pipette tip. The amount of liquid drawn up and dispensed depends on the stroke of the stroke rod between the lower and upper stop.

In the case of fixed-volume pipettes, the distance between the upper and lower stop is constant. In the case of pipettes having an adjustable metering volume, the position of the upper stop is variable. Known pipettes having an adjustable metering volume comprise an upper stop on the lower face of a threaded spindle that can be adjusted in a spindle nut fixedly arranged in the housing. Adjustment apparatuses which are coupled to display apparatuses for displaying the set metering volume in the form of a counter are provided for adjusting the threaded spindle.

Air cushion pipettes have an overstroke for dispensing remaining quantities of liquid from the pipette tip. The lower stop can be displaced by applying a greater force in order to carry out the overstroke. In known pipettes, the lower stop is formed on a stop body that is supported in the housing via an overstroke spring, such that it can be displaced by a certain overstroke by applying a greater force.

Furthermore, electronic pipettes are known, in which the drive apparatus comprises an electric motor and a transmission coupling the electric motor to the displacement element and which comprise an electronic control apparatus that controls the electric motor such that the displacement element performs the desired strokes.

Both manual and electronic air cushion pipettes are designed and calibrated for use with the forward pipetting technique. In the case of forward pipetting, the stroke rod is displaced from the upper stop to the lower stop by pressing the operating button before liquid is taken up. After the pipette tip has been immersed in the liquid and after the operating button has been released, the stroke rod moves back up to the upper stop and the desired amount of liquid is taken up. To dispense the liquid, the operating button is pressed until the stop element strikes the lower stop and the overstroke has been fully performed. Subsequently, there is no longer any liquid in the pipette tip.

However, during handling by the user, a second pipetting technique can be used, i.e. so-called reverse pipetting. In this case, proceeding from the rest position, in which the stroke rod rests against the upper stop, the operating button is pressed down until the overstroke is performed. After the pipette tip has been immersed in the liquid, the operating button is then released in order to take up liquid, and therefore the stroke rod slides back up to the upper stop. To dispense the liquid, the operating button is pressed down until the stroke rod reaches the lower stop. Afterwards, liquid still remains in the pipette tip, since the overstroke is not performed during dispensing. This remaining liquid is not part of the metering volume and is discarded or returned to the original vessel. Reverse pipetting has advantages, in particular, in the case of viscous solutions, solutions with a high vapor pressure, and strongly wetting solvents. There are also laboratories, for example in the USA, which generally use this technique, i.e. also for watery liquids.

Gravimetric tests (EN ISO 8655-6) have shown that the reverse pipetting technique leads to a larger systematic measurement deviation (EN ISO 8655-1) than the forward technique. In addition, the use of the reverse pipetting technique is associated with increased consumption of reagents, since the remaining liquid (overstroke) is potentially discarded with the tip. Finally, performing the overstroke during uptake of a liquid leads to increased uptake of sample liquid, which may potentially be drawn into the pipette or the filter of a filter pipette tip.

BRIEF SUMMARY OF THE INVENTION

Proceeding from this, the object of the invention is to provide an air cushion pipette which, in addition to forward pipetting, also allows for reverse pipetting with a reduced measurement deviation, which saves on reagents, and which prevents liquid from being drawn into the pipette or the filter of a filter pipette tip.

An embodiment of an air cushion pipette includes at least one seat structured to releasably hold a pipette tip. A displacement apparatus includes a displacement chamber having a displacement element structured to be displaced therein and delimit a displacement volume inside the displacement chamber. A connecting channel connects the displacement volume to an opening in the seat. A drive apparatus is coupled to the displacement element and is structured to displace the displacement element in the displacement chamber. An upper stop, a lower stop, and a stop element are connected to the drive apparatus and structured to limit the displacement of the displacement element in the displacement chamber. The air cushioned pipette further includes an overstroke apparatus comprising the lower stop that is structured to be displaced downwards by the stop element when the stop element presses with a minimum force against the lower stop, wherein the downward displacement of the lower stop is limited to a first overstroke. A displaceable overstroke limiting element or means permits the displacement of the lower stop downwards by the first overstroke in a release position and limits said displacement to a second overstroke that is shorter than the first overstroke in a blocking position. A switching apparatus is connected to the overstroke limiting element in order to either displace the overstroke limiting element into the release position for forward pipetting or into the blocking position for reverse pipetting.

Another embodiment of an air cushion pipette according to the invention includes at least one seat structured to releasably hold a pipette tip. A displacement apparatus includes a displacement chamber having a displacement element structured to be displaced therein and delimits a displacement volume inside the displacement chamber. A connecting channel is structured to connect the displacement volume to an opening in the seat and a drive apparatus is coupled to the displacement element and structured to displace the displacement element in the displacement chamber. The drive apparatus further includes an electric motor and a transmission coupling the electric motor to the displacement element. An electronic control apparatus is connected to the electric motor and structured to control the electric motor such that, in a mode of operation for forward pipetting, the displacement element is displaced from an upper end position into a lower end position, from the lower end position into the upper end position, and from the upper end position into a first overstroke position arranged deeper than the lower end position by a first overstroke. Wherein, when in a mode of operation for reversing pipetting, the displacement element is displaced from the upper end position into a second overstroke position that is arranged deeper than the lower end position by a second overstroke that is shorter than the first overstroke, from the second overstroke position into the upper end position, and from the upper end position into the lower end position. The air cushioned pipette further includes a switching apparatus connected to the electronic control apparatus in order to put the electronic control apparatus either into the mode of operation for forward pipetting or into the mode of operation for reverse pipetting.

In an embodiment of the air cushion pipette according to the invention (also referred to in the following as "pipette"), the systematic measurement deviation is significantly reduced during reverse pipetting due to the reduction in the overstroke volume during reverse pipetting with respect to the overstroke volume during forward pipetting and is brought in line with the systematic measurement deviation during forward pipetting. According to the findings underlying the invention, the systematic error for one and the same air cushion pipette with a particular overstroke is significantly different for forward pipetting and reverse pipetting. By switching from a first overstroke during forward pipetting to a shorter second overstroke during reverse pipetting, the systematic measurement deviations can be brought closer together in these two pipetting techniques. Experimental results from different users that prefer different pipetting techniques are made more comparable as a result.

By means of the switching apparatus, it is possible to switch between the first overstroke for forward pipetting and the second overstroke for reverse pipetting in an uncomplicated manner without having to recalibrate the air cushion pipette. This gives the user maximum freedom to alternate the use of their air cushion pipette for forward pipetting of watery liquids and for reverse pipetting of non-watery or special liquids.

During reverse pipetting, on account of the reduced overstroke, reagents are spared compared with reverse pipetting with the same overstroke as during forward pipetting, since the sample volume taken up with the overstroke is generally discarded in reverse pipetting.

On account of the reduced overstroke during reverse pipetting, conventional pipette tips, in particular filter tips, can also be used with the nominal volume during reverse pipetting. In contrast, reverse pipetting of the nominal volume of the pipette tip using the same overstroke as during forward pipetting results in the sample liquid being drawn into the working cone of the pipette, potentially contaminating same, or it enters the filter of the pipette tip and the sample liquid is contaminated by the filter material and/or is dispensed incompletely, i.e. imprecisely. Overall, the invention improves the pipetting accuracy, facilitates switching between forward pipetting and reverse pipetting, saves on reagents during reverse pipetting, and the scope of application of pipette tips is expanded for reverse pipetting.

The first overstroke and the second overstroke are in each case a displacement path of the displacement element with a certain fixed length. In an exemplary embodiment, the first overstroke for forward pipetting is 4 mm and the second overstroke for reverse pipetting is 1 mm, at a distance from the upper stop to the lower stop (metering stroke) of 16 mm. The invention relates to both manually driven and electronic pipettes.

According to one embodiment of the manually driven pipette, the drive apparatus is connected to an operating button by means of which the displacement of the displacement element can be controlled. The operating button is preferably a pushbutton that protrudes upwards from the upper end of a rod-like housing. By pressing the operating button downwards, the drive apparatus can be actuated in order to displace the displacement element in the displacement chamber.

According to another embodiment, the drive apparatus comprises a stroke rod that is coupled to the displacement element at the lower end, that can be displaced in the longitudinal direction, and that comprises the stop element on the outer periphery, and an operating button that is connected to the upper end of the stroke rod for displacing the displacement in the displacement chamber. According to another embodiment, the coupling between the stroke rod and the displacement element is structured such that the lower end of the stroke rod presses against the upper face of a plate that is connected to the upper end of a plunger that can be displaced in a cylinder and that forms the displacement element. According to another embodiment, the plate is loaded towards the stroke rod by means of a spring apparatus. This is advantageous for a structural design in which the pipette has an upper part comprising the drive apparatus and a lower part comprising the displacement apparatus, wherein the coupling of the stroke rod and displacement element is produced when the upper part and lower part are put together. Alternatively, the stroke rod is rigidly connected to the displacement element.

Another embodiment comprises a return spring which loads the drive apparatus in the direction of contact of the stop element on the upper stop. This ensures that, when the operating button is released, the drive apparatus automatically assumes a rest position in which the stop element rests against the upper stop.

According to another embodiment, the stroke rod is guided through the central bore of a threaded spindle that is screwably held in a spindle nut and comprises the upper stop for the stop element on the lower end face. By adjusting the threaded spindle, it is possible to adjust the stroke performed by the stroke rod during displacement of the stop element from the upper stop to the lower stop and vice versa. As a result, the metering volume to be taken up and dispensed during pipetting can be adjusted. According to another embodiment, the threaded spindle is coupled to an adjusting button in order to adjust the threaded spindle in the spindle nut. According to another embodiment, the adjusting button is formed separately from the operating button. According to another embodiment, the adjusting button is structured as a sleeve and encloses the operating button, which protrudes upwards relative to the adjusting button. According to another embodiment, the adjusting button is simultaneously the operating button.

According to another embodiment, the stop element is at least one projection on the periphery of the stroke rod. According to another embodiment, the stop element is a single circumferential projection or rather bead on the periphery of the stroke rod.

According to another embodiment, the displaceable overstroke limiting element is a slider that is guided in a guide in the operating button and can be displaced in the guide from a release position, in which it does not protrude outwards from the operating button, into a blocking position that protrudes outwards at least in part relative to the operating button, above an edging arranged next to the operating button. In the release position, the slider does not limit the displacement of the operating button, such that the operating button can be actuated such that the first overstroke is performed. In the blocking position, the slider limits the downward displacement of the operating button on account of contact with the edging, such that it can only control the performance of the second overstroke. According to another embodiment, the edging is an adjusting button.

According to another embodiment, the displaceable overstroke limiting element is a slider that is guided in a stationary guide and can be displaced in the guide from a release position, in which it does not project outwards from the guide, into a blocking position that projects outwards at least in part from the guide, in the displacement path of the operating button, stroke rod, or overstroke apparatus. In the release position, the slider does not limit the displacement of the operating button, stroke rod, or overstroke apparatus, such that the first overstroke can be performed. In the blocking position, the slider limits the displacement of the operating button, stroke rod, or overstroke apparatus, such that only the second overstroke can be performed.

According to another embodiment, the switching apparatus is an operating element or tool engagement portion formed on the slider. The slider may be displaced by manually actuating the operating element (e.g. a protruding hook or corrugations) or by inserting a tool into the tool engagement portion (e.g. a slot for inserting a screwdriver blade).

According to one embodiment of the electronic pipette, the electronic control apparatus is connected to a switch (e.g. a pushbutton), touchscreen, microphone, and/or another input apparatus in order to operate the pipette. By means of one or more input apparatuses, in particular the displacement of the displacement element can be controlled, pipetting parameters (e.g. the metering volume, plunger speed) can be adjusted, and the electronic pipette can be put either into the mode of operation for forward pipetting or that for reverse pipetting. According to another embodiment, the input apparatus is a pushbutton, wherein various displacements of the displacement element can be controlled by means of successive actuations of the pushbutton. According to another embodiment, the switching of the various modes of operation is controlled by means of an additional pushbutton or another switch (e.g. rocker switch or sliding switch) or another input apparatus. A touchscreen can, in particular, be used to input metering parameters and/or to switch between various modes of operation. A microphone can be used to operate the pipette by means of voice control.

According to another embodiment, the electronic control apparatus controls the electric motor in the mode of operation for reverse pipetting such that, in a further step, after the displacement element has been displaced from the upper end position into the lower end position, the displacement element is displaced downwards by the first overstroke or by the second overstroke. As a result, the remaining sample liquid can be dispensed from the pipette tip.

The subsequent embodiments apply both for manually driven and for electronic pipettes.

According to one embodiment, during forward pipetting, after liquid is taken up by displacing the displacement element from the lower end position into the upper end position, the displacement element is displaced from the upper end position into the lower end position in order to dispense the metering volume and then remains in the lower end position at least for a short pause, such that any liquid can run down the inner wall of the pipette tip. According to a preferred embodiment, the displacement element is then displaced from the lower end position by the first overstroke and remaining liquid is blown out of the pipette tip, preferably into a waste vessel or, if applicable, back into the original vessel. The displacement is then displaced from the first overstroke position back into the upper end position, which constitutes the initial position for renewed liquid uptake. The overstroke step is good laboratory practice during forward pipetting. Said step can also be dispensed with and the displacement element can be displaced from the lower end position directly back into the upper end position. The manually driven pipette according to the present invention can be operated as described above and the electronic pipette according to the present invention can be controlled by means of the electronic control apparatus and the switching apparatus as described above.

According to another embodiment, there are two options during reverse pipetting after the liquid has been dispensed by displacing the displacement element from the upper end position into the lower end position: According to a first option, the pipette tip can be immersed again in the liquid for renewed liquid uptake and, subsequently, the displacement element can be displaced from the lower end position into the upper end position. According to a second option, the remaining liquid in the pipette tip can be emptied, for example, into a waste vessel or, if applicable, back into an original vessel, i.e. the displacement element is displaced downwards from the lower end position by the second overstroke. Subsequently, the pipette tip can be discarded. The manually driven pipette according to the present invention can be operated as described above and the electronic pipette of the present invention can be controlled by means of the electronic control apparatus and the switching apparatus as described above.

According to another embodiment, the displacement apparatus comprises a cylinder and a plunger that can be displaced in the cylinder. By displacing the plunger in the cylinder, the displacement volume in the displacement chamber can be changed. Air cushion pipettes having a displacement apparatus that comprise a cylinder and a plunger that can be displaced therein are widely used. Alternatively, the displacement apparatus is a flexible membrane that is secured in the displacement chamber at the edges so as to provide a sealing effect.

According to another embodiment, the pipette comprises a housing, a frame, a chassis, or another support structure. The support structure serves to hold the components of the pipette. Components of the pipette that do not change their relative position during operation can be fastened to the support structure. These include, for example, a stationary working cone or another seat for releasably holding a pipette tip, the displacement chamber, parts of the drive apparatus (e.g. the spindle nut or electric motor), parts of the overstroke apparatus, a stationary guide for the overstroke limiting means, the electronic control apparatus, the switching apparatus, and/or another input apparatus. Other components of the pipette are displaceably held on the support structure. These include, for example, the displacement element, parts of the drive apparatus (e.g. the stroke rod), the upper stop, the lower stop, the threaded spindle, and the displaceable overstroke limiting element.

According to another embodiment, the pipette is a handheld pipette, an automatic pipetting machine, or a pipetting device integrated in an automatic laboratory machine. A handheld pipette is a pipette that can be held and operated with only one hand. The handheld pipette may be a manually driven pipette or an electronic pipette. An automatic pipetting machine or a pipetting device integrated in an automatic laboratory machine is preferably an electronic pipette.

According to another embodiment, the pipette is a mechanically driven pipette, an electrically driven pipette, or a hybrid mechanically and electrically driven pipette. A hybrid mechanically and electrically driven pipette may comprise a mechanical drive with electrical support (servo drive).

According to another embodiment, the pipette is a single-channel pipette or a multichannel pipette. A single-channel pipette comprises only one single seat for releasably holding a pipette tip and a single displacement apparatus. A multichannel pipette comprises multiple seats for releasably holding pipette tips that are connected to a single displacement apparatus or to multiple displacement apparatuses.

BRIEF DESCRIPTION OF THE DRAWINGS

The invention is explained in more detail below based on the accompanying drawings of exemplary embodiments. In the drawings:

FIG. 3.1 shows an embodiment of an adjusting mechanism of the pipette of FIG. 1 magnified in a side view from the right-hand side.

FIG. 3.2 shows a front view of the embodiment of the adjusting mechanism of the pipette of FIG. 3.1.

FIG. 3.3 shows a side view from the left-hand side of the embodiment of the adjustment mechanism of FIG. 3.1.

FIG. 3.4 shows a rear view of the embodiment of the adjusting mechanism of the pipette of FIG. 3.1.

FIG. 4.1 shows the same adjusting mechanism from FIG. 3.1 in a different switching stage, magnified in a side view from the right-hand side.

FIG. 4.2 shows a front view of the embodiment of the adjusting mechanism of FIG. 4.1.

FIG. 4.3 shows a side view from the left-hand side of the embodiment of the adjusting mechanism from FIG. 4.1.

FIG. 4.4 shows a rear view of the embodiment of the adjusting mechanism from FIG. 4.1.

FIG. 5.1 shows a perspective top view of an embodiment of a pipette during a forward pipetting procedure.

FIG. 5.2 shows another perspective view of the embodiment of the pipette of FIG. 5.1 during the forward pipetting process.

FIG. 5.3 show another perspective view the embodiment of the pipette of FIG. 5.1 during the forward pipetting process.

FIG. 6.1 shows a perspective top view of an embodiment of a pipette during a reverse pipetting process.

FIG. 6.2 shows another perspective view of the embodiment of the pipette of FIG. 6.1 during the reverse pipetting process.

FIG. 6.3 shows another perspective view of the embodiment of the pipette of FIG. 6.1 during the reverse pipetting process.

FIG. 7.1 shows perspective top view of an embodiment of a displaceable overstroke limiting element in a release position.

FIG. 7.2 shows a perspective top view of the displaceable overstroke limiting element of FIG. 7.1 in a blocking position.

FIG. 8.1 shows a perspective top view of another embodiment of a displaceable overstroke limiting element in a release position.

FIG. 8.2 shows a perspective top view of the displaceable overstroke limiting element of FIG. 8.1 in a blocking position.

FIG. 9.1 shows a perspective top view of another embodiment of the displaceable overstroke limiting element in a release position.

FIG. 9.2 shows a top perspective view of the embodiment of FIG. 9.1 in a blocking position.

DETAILED DESCRIPTION OF THE INVENTION

In the present application, the indications "at the top" and "at the bottom", "above" and "below", as well as derived terms such as "lower face" and "upper face" as well as "horizontal" and "vertical" relate to an orientation of the pipette in which the seat is arranged at the lower end of the pipette and is oriented vertically downwards. In this orientation, a pipette tip attached on the seat can be directed towards a vessel located below in order to draw up liquid into the pipette tip and discharge said liquid from the pipette tip.

Basic features of a manually driven air cushion pipette that are or may also be present in the air cushion pipette designed according to the invention are explained below based on FIGS. 1 to 6. A displaceable overstroke limiting element of the pipette according to the invention is not present in the pipette of FIGS. 1 to 6. Examples of the various embodiments of a displaceable overstroke limiting element are explained based on FIGS. 1 to 10. These embodiments of a displaceable overstroke limiting element may, in the case of a pipette according to FIGS. 1 to 6, have corresponding adaptations and additions to the design. FIGS. 1 to 6 therefore do not show all of the features of an air cushion pipette according to the invention, but merely facilitate understanding thereof.

Figure 1:
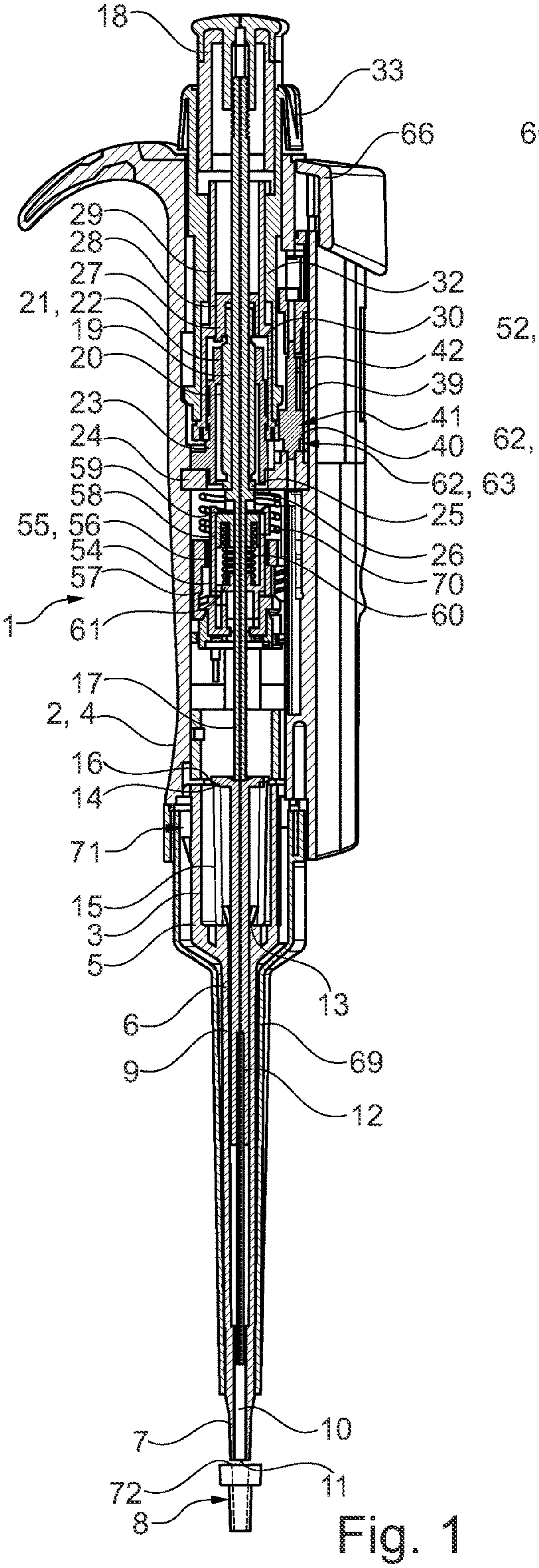
FIG. 1 shows a longitudinal section of an embodiment of a pipette from the left-hand side.
Figure 2:
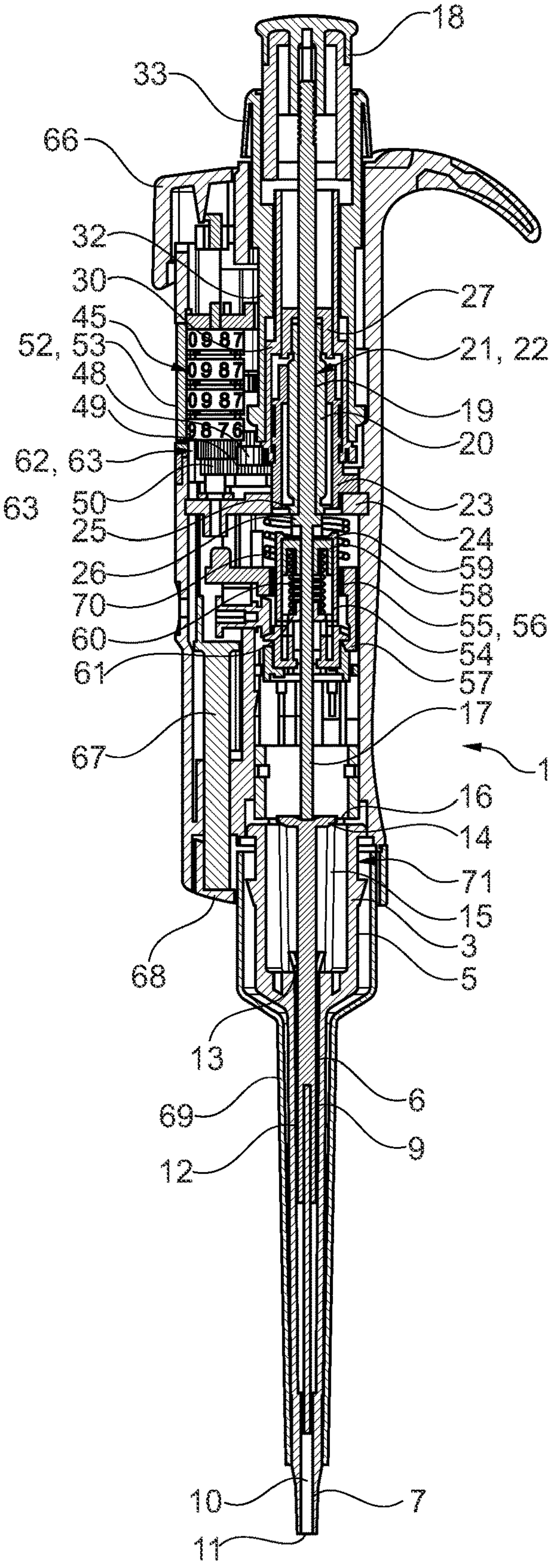
FIG. 2 shows a longitudinal section from the right-hand side of the pipette of FIG. 1.

According to FIGS. 1 and 2, a pipette 1 has a rod-shaped housing 2 comprising a housing lower part 3 and a housing upper part 4. At the top, the housing lower part 3 has a tubular main body 5 comprising a conical base from which a thin, tubular, slightly conical attachment 6 protrudes, which attachment, on the lower end, comprises a seat 7 for mounting a pipette tip 8. A displacement chamber 9 in the form of a cylinder is formed in the attachment 6 and is connected via a connecting channel 10 to an opening 11 in the lower face of the seat 7.

The housing lower part 3 comprises a displacement element 12 in the form of a plunger of the displacement apparatus, which plunger is guided into the cylinder 11 via a sealing system 13 on the upper face of the base. On the upper end, the displacement element 12 comprises a plate 14, which has a cup-shaped depression centrally on the upper face. A first spring apparatus 15 in the form of a helical spring is arranged between the plate 14 and the upper face of the base. The first spring apparatus 15 presses the plate 14 from below against a closure cap 16, which is connected to the main body 5 and in the center comprises a passage through which the plate 14 is accessible from above.

The housing upper part 4 contains a stroke rod 17, which rests against the upper face of the plate 14. The lower end of the stroke rod 17 engages in the depression in the plate 14. At the top, an operating button 18, which protrudes outwards from the upper end of the housing 2, is secured to the stroke rod 17.

The stroke rod 17 is guided through a central spindle bore 19 of a threaded spindle 20, which is arranged in the housing upper part 4. On the outside, the threaded spindle 20 has an external thread 21, which can be screwed into an internal thread 22 of a stroke body 23, which is held at the bottom on a first support 24 in the housing upper part 4. The stroke body 23 forms a spindle nut.

The lower end face of the threaded spindle 20 is an upper stop 25 for a stop element 26 in the form of an annular bead on the outer periphery of the stroke rod 17.

The threaded spindle 20 is connected at the upper end to a catch 27 for conjoint rotation therewith, which catch engages in axial grooves 29 of a catch sleeve 30 by means of radially outwardly protruding ribs 28. The catch sleeve 30 is arranged concentrically with respect to the threaded spindle 20 and is rotatably mounted on the outer periphery of the stroke body 23. The catch sleeve 30 has a first set of circumferential teeth 31 on the lower edge on the outer periphery (cf. FIG. 3, 4).

An adjusting sleeve 32 is pushed onto the catch sleeve 30. The adjusting sleeve 32 is rotatably mounted on the outer periphery of the catch sleeve 30 and is displaceably guided on the catch sleeve 30 in the axial direction between two limits. The upper end of the adjusting sleeve 32 protrudes outwards from the upper end of the housing 2. There, on the outer periphery, the adjusting sleeve 32 comprises an adjusting ring 33, which bears corrugations on the outer periphery.

The adjusting sleeve 32 has a second set of circumferential teeth 34 on the outer periphery on the lower edge and, somewhat higher up, a third set of circumferential teeth 35 on the outer periphery. The first set of teeth 31 and the second set of teeth 34 have the same diameter and the same number of teeth. The third set of teeth 35 has a larger diameter and a larger number of teeth than the second set of teeth 34.

The second set of teeth 34 is closed at the top and the third set of teeth 35 is closed at the bottom by means of an intermediate disc 36. The lower face of the disc 36 forms a lower limit 37 and the upper face of the disc 36 forms an upper limit 38 for the displacement of the adjusting sleeve 32.

A transmission shaft 39 is rotatably mounted on the first support 24 next to the catch sleeve 30 and the adjusting sleeve 32. The transmission shaft 39 is provided at the bottom with a fourth set of teeth 40, above that with a fifth set of teeth 41, and above that with a sixth set of teeth 42. The fourth set of teeth 40 and the fifth set of teeth 41 have the same diameter and the same number of teeth and are combined to form a single set of teeth 43. The sixth set of teeth 42 is arranged at a distance from the fifth set of teeth 41. It has a smaller diameter and a smaller number of teeth than the fifth set of teeth 41.

The transmission shaft 39 is rotatably mounted at the top in a second support 44, which is secured in the housing upper part 4.

A counter 45 in the form of a roller counter is held between the first support 24 and the second support 44. A counting roller shaft 46 of the roller counter is mounted at the bottom in the first support 24 and at the top in the second support 44. The second support 44 is supported at the top on a projection in the housing. A drive gear 47 is rotatably mounted on the first support 24 on a first shaft, which drive gear comprises two spur gears 48, 49 that have different diameters and are interconnected for conjoint rotation. The spur gear 48 with the smaller diameter meshes with the first set of teeth 31 of the catch sleeve 30 and the spur gear 49 with the larger diameter meshes with a drive pinion 50 on a starter roller of the roller counter.

The number rollers 51 of the counter 45 are visible from the outside of the housing 2 through a window 52 in the housing upper part 4, which window has a transparent cover 53 (cf. FIG. 2).

A pot-shaped holder 54 is arranged in the housing upper part 4 below the stroke body 23. The holder 54 has an external thread 55, which is screwed into an internal thread 56 of a third support 57 fastened in the housing 2.

The holder 54 contains a cap-shaped lower stop 58, which is held below a downwardly curved upper edge 59 of the holder 54. An overstroke spring 60 in the form of a helical spring, which is supported on the base 61 of the holder 54, presses the lower stop 58 against the upper edge 59. The stroke rod 17 is guided through central passages in the lower stop 58, through the overstroke spring 60, and through a central passage in the base 61 of the holder 54.

The adjusting sleeve 32 is an input shaft, the catch sleeve 30 is an output shaft, and the transmission shaft 39 is a countershaft of a switching transmission 63 designed as a spur gear transmission 62. The switching between the various switching stages is effected by axially shifting the adjusting sleeve 32 into a lower switching position shown in FIG. 3 (fine adjustment position) and into an upper switching position shown in FIG. 4 (quick adjustment position). In the fine adjustment position of FIG. 3, the adjusting sleeve 32 has been shifted downward to a maximum extent so as to contact the lower limit 37 on the upper face of the fifth set of teeth 41 and, in the quick adjustment position, the adjusting sleeve 32 has been shifted upward so as to contact the upper limit 38 on the lower face of the sixth set of teeth 42. The adjusting sleeve 32 is therefore simultaneously a switching apparatus 64 of the switching transmission, wherein the adjusting ring 33 is a switching element 65 of the switching apparatus 64.

When the adjusting sleeve 32 rotates, the catch sleeve 30 also rotates according to the respectively set switching stage. The threaded spindle 20 is screwed into the internal thread 22 fixed to the housing by means of the catch sleeve 30 and the upper stop 25 moves upwards or downwards depending on the direction of rotation. This adjusts the distance between the upper stop 25 and the lower stop 58, which determines the metering volume. The respectively set metering volume can be read on the counter 45, which is driven by means of the drive gear 47 of the catch sleeve 30.

An ejection button 66 sits on an ejection rod 67 next to the adjusting sleeve 32 on the upper edge region of the housing upper part 4. The ejection button 67 extends in parallel with the stroke rod 17 through the housing upper part 4. The lower end of said rod is connected to a lateral fastening attachment 68 of an ejection sleeve 69, which is shiftably arranged on the attachment 6.

An ejection spring 70 designed as a helical spring is arranged in the housing upper part 4, which ejection spring is supported on the one hand in the housing 2 and on the other hand on the ejection rod 67. The ejection spring 70 presses the ejection rod 67 upwards, such that the ejection sleeve 67 comes to rest against the attachment 6. The housing lower part 3 and the housing upper part 4 are interconnected by means of a snap-on connection 71.

Prior to pipetting, the user can set the desired metering volume. For this purpose, said user rotates the adjusting ring 33 until the desired metering volume is displayed on the counter 45. To set the quick switching stage, the user pulls the adjusting sleeve 32 on the adjusting ring 33 out of the fine adjustment position of FIG. 3 somewhat further out of the housing 2 into the quick adjustment position.

In the quick adjustment position of FIG. 4, the first set of teeth 31 of the catch sleeve 30 meshes with the fourth set of teeth 40 of the transmission shaft 39 and the third set of teeth 35 of the adjusting sleeve 32 meshes with the sixth set of teeth 42 of the transmission shaft 39. As a result, the rotational speed of the adjusting sleeve 32 is changed to a higher rotational speed of the catch sleeve 30, such that the user can quickly set the metering volume approximately to the metering volume to be set.

To set the slow switching stage, the user presses the adjusting sleeve 32 at the adjusting ring 33 deeper into the housing 2 into the fine adjustment position. In this position, the first set of teeth 31 meshes with the fourth set of teeth 40 and the second set of teeth 34 meshes with the fifth set of teeth 41. This has the result that a rotation of the adjusting sleeve 32 at a particular rotational speed causes a rotation of the catch sleeve 30 at a lower rotational speed than in the quick switching stage. In the example, the rotational speed of the adjusting sleeve 32 is the same as the rotational speed of the catch sleeve 30, since the first set of teeth 31 and the second set of teeth 34 as well as the fourth set of teeth 40 and fifth set of teeth 41 in each case have the same number of teeth and the same diameter.

The user can clamp a pipette tip 8 onto the pipette 1 by pressing the seat 7 of the pipette 1 into the upper opening 72 of the pipette tip 8. For forward pipetting, the user first presses the operating button 18 downwards, such that the stop element 26 is displaced from the upper stop 25 against the lower stop 58. In the process, the stroke rode 17 presses the displacement element 12 downwards and the first spring apparatus 15 is preloaded. Subsequently, the user immerses the lower opening 73 of the pipette tip 8 into the sample liquid and releases the operating button 18. As a result, the first spring apparatus 15 presses the displacement element 12 and stroke rod 17 upwards until the stop element 26 comes to rest against the upper stop 25. In the process, an amount of liquid corresponding to the set metering volume is drawn into the pipette tip 8.

To dispense the quantity of liquid, the user holds the lower opening 73 of the pipette tip 8 over another vessel and presses the operating button 18 downwards again. Once the lower stop 58 has been reached, the user can press the operating button 18 in even deeper by overcoming the resistance of the overstroke spring 60 in order to expel remaining liquid from the pipette tip 8 by means of an overstroke.

Subsequently, another quantity of liquid can be pipetted in the same way or, for a change of sample liquid, the pipette tip 8 can be ejected downwards by pressing the ejection button 66. In the process, the ejection sleeve 69 strips the pipette tip 8 from the seat 7. After the ejection button 66 is released, the ejection spring 70 displaces the ejection rod 67 back into the initial position shown.

According to FIGS. 5.1 to 5.3, during the above-described forward pipetting for taking up liquid, the operating button 18 is pressed down, such that the stop element 26 is displaced from the upper stop 25 down to the lower stop 58 and air is pressed out of the displacement chamber 9 (FIG. 5.1). Subsequently, the operating button 18 is released and slides back until the stop element comes to rest against the upper stop 25 (FIG. 5.2). In the process, sample liquid is drawn into a pipette tip 8 clamped onto the seat 7.

Subsequently, in order to dispense the liquid, the operating button 18 is pressed downwards again until the stop element 26 strikes the lower stop. With a greater force, the operating button is pressed further downwards and the overstroke is performed (FIG. 5.3). The overstroke is achieved when the overstroke spring 60 has been compressed to a maximum extent. Subsequently, there is no longer any sample liquid in the pipette tip 8.

According to FIGS. 6.1 to 6.3, during reverse pipetting for taking up liquid, the operating button 18 is pressed down, such that the stop element 26 is displaced from the upper stop 25 down to the lower stop 58 and the lower stop 58 performs the overstroke (FIG. 6.1). In the process, air is pressed out of the displacement chamber 9. After the operating button 18 is released, it slides back until the stop element 26 comes to rest against the upper stop 25, wherein liquid is drawn into the pipette tip 8 (FIG. 6.2).

To dispense the liquid, the operating button 18 is pressed downwards again, such that the stop element 26 is moved from the upper stop 25 down to the lower stop 58. In the process, the selected metering volume is dispensed (FIG. 6.3). Afterwards, there is still liquid remaining in the pipette tip 8. This liquid can be discarded, wherein the operating button 18 is pressed down with greater force, such that the overstroke is performed.

The pipette of FIGS. 1 to 6.3 may be configured as will be further described. The overstroke system of the pipette of FIGS. 1 to 6.3 formed by the holder 54 with the lower stop 58 and the overstroke spring 60 may be designed such that the first overstroke is achieved by means of maximum compression of the overstroke spring 60. In addition, an adjustable stop may be provided, which can be displaced by means of a slider or a thread in order to downwardly limit the path of the cap-shaped lower stop 58, such that the stop 58 can only perform the second overstroke, which is shorter than the first overstroke.

In the exemplary embodiment of FIGS. 7.1 and 7.2, the operating button 18 comprises a horizontal guide 74. A rod-shaped slider 75 is inserted into the guide 74, which slider can be pushed completely into the guide 74 such that, in a release position, it does not protrude beyond the adjusting ring 33 at the ends of the guide 74. Therefore, the operating button 18 can be pressed deep into the adjusting ring 33, such that the entire first overstroke (e.g. 4 mm) is performed. This is shown in FIG. 7.1. This setting of the slider 75 is selected during forward pipetting.

The slider 75 can be displaced in such a way in the guide 74 by pressing against an end face 76 that, in a blocking position, it partially projects laterally outwards beyond the guide 74. The laterally projecting part of the slider 75 strikes against the upper edge of the adjusting ring 33 when the operating button 18 is pressed down. As a result, the downward displacement of the operating button 18 is limited, such that only a reduced second overstroke (e.g. 1 mm) can be performed. This is shown in FIG. 7.2. This setting of the slider 75 is selected during reverse pipetting, since the systematic measurement error is reduced as a result.

The exemplary embodiment of FIGS. 8.1 and 8.2 differs from the above-described embodiment in that an L-shaped slider 77 having a horizontal leg 78 is inserted in a horizontal guide 74 of the operating button 18. A vertical leg 79 of the slider is accessible from above in the operating button 18 by means of a vertical channel 80 in order to laterally displace the slider 77.

In FIG. 8.1, the slider 77 is shown in a release position, in which it does not laterally protrude from the operating button 18. Consequently, during forward pipetting, the operating button 18 can be pressed down fully and the first overstroke can be performed. In FIG. 8.2, the slider 77 is displaced into the blocking position, in which its horizontal leg 78 partially protrudes laterally from the operating button 18, such that the protruding part of the leg 78 strikes the adjusting ring 33 when the operating button 18 is pressed down, such that only the reduced second overstroke is possible during reverse pipetting.

The exemplary embodiment of FIGS. 9.1 and 9.2 comprises a panel-shaped slider 81 behind the ejection button 66, which panel-shaped slider is guided in a stationary vertical guide 82 in the housing 2. For forward pipetting, the slider 81 can be displaced downwards inside the vertical guide 82, such that it does not limit the downward displacement of the operating button 18, as shown in FIG. 9.1. In this release position of the slider 81, the first overstroke can be performed by actuating the operating button 18.

According to FIG. 9.2, for reverse pipetting, the slider 81 can be displaced upwards in the vertical guide 82 in a blocking position and secured in said position by means of suitable locking means (e.g. by means of a set of teeth). In the blocking position of the slider 81, when the operating button 18 is pressed down, a circumferential flange 83 on the upper edge of said operating button strikes the upper edge of the slider 81, as a result of which the operating button 18 cannot be pushed down further and only the second overstroke can be performed.

Figure 10:
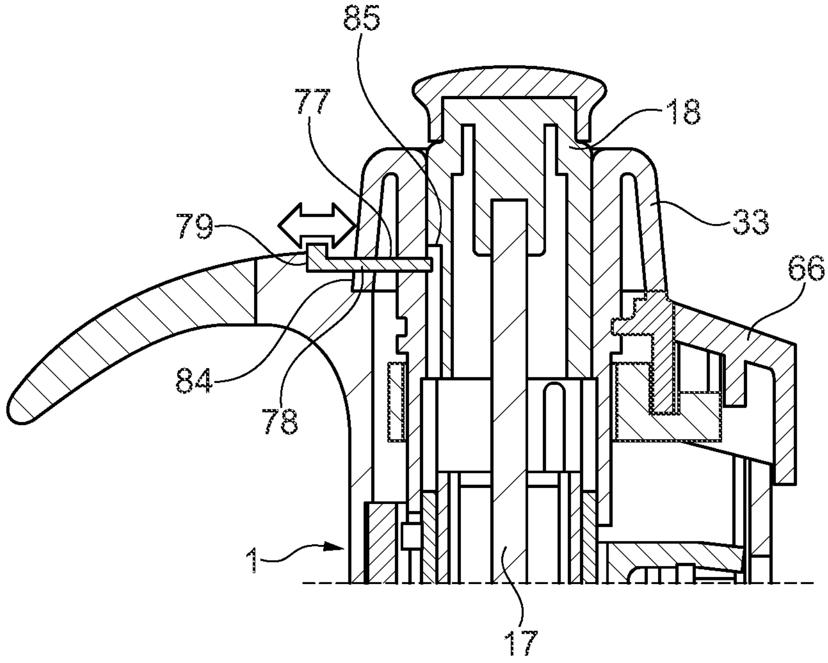
FIG. 10 shows a longitudinal section of another embodiment of the displaceable overstroke limiting element having a slider that is guided in a guide in the adjusting ring.

According to FIG. 10, an L-shaped slider 77 is inserted into a horizontal guide 84 in the adjusting ring 33, which slider can be slid by means of an end region under a shoulder 85 of its horizontal leg 78 of the operating button 18. To displace the slider 77, same comprises an operating element in the form of an upwardly protruding vertical leg 79. In the release position, the slider 77 does not engage under the shoulder 85 of the operating button 18, such that same can be pressed down fully and the first overstroke can be performed. In the blocking position, the end region of the slider 77 engages below the shoulder 85, such that the operating button 18 can only be pressed down to a lesser extent and only the reduced second overstroke can be performed.

In each of the exemplary embodiments of FIGS. 7.1 to 10, by displacing the slider from the release position into the blocking position, the systematic error during reverse pipetting is reduced and brought in line with the systematic error during forward pipetting. The slider is brought into the release position for forward pipetting.

LIST OF REFERENCE SIGNS

1 Pipette
2 Housing
3 Housing lower part
4 Housing upper part
5 Main body
6 Attachment
7 Seat
8 Pipette tip
9 Displacement chamber
10 Connecting channel
11 Opening
12 Displacement element
13 Sealing system
14 Plate
15 Spring apparatus
16 Closure cap
17 Stroke rod
18 Operating button
19 Spindle bore
20 Threaded spindle
21 External thread
22 Internal thread
23 Stroke body
24 First support
25 Upper stop
26 Stop element
27 Catch
28 Ribs
29 Grooves
30 Catch sleeve
31 Set of teeth
32 Adjusting sleeve
33 Adjusting ring
34 Second set of teeth
35 Third set of teeth
36 Disc
37 Lower limit
38 Upper limit
39 Transmission shaft
40 Fourth set of teeth
41 Fifth set of teeth

42 Sixth set of teeth
43 Set of teeth
44 Second support
45 Counter
46 Counting roller shaft
47 Drive gear
48, 49 Spur gear
50 Drive pinion
51 Number roller
52 Window
53 Cover
54 Holder
55 External thread
56 Internal thread
57 Third support
58 Lower stop
59 Upper wheel
60 Overstroke spring
61 Base
62 Spur gear transmission
63 Switching transmission
64 Switching apparatus
65 Switching element
66 Ejection button
67 Ejection rod
68 Fastening attachment
69 Ejection sleeve
70 Ejection spring
71 Snap-on connection
72 Upper opening
73 Lower opening
74 Horizontal guide
75 Rod-shaped slider
76 End face
77 L-shaped slider
78 Horizontal leg
79 Vertical leg
80 Channel
81 Panel-shaped slider
82 Stationary vertical guide
83 Flange
84 Horizontal guide
85 Shoulder

The invention claimed is:

1. An air cushion pipette comprising:

at least one seat configured to releasably hold a pipette tip;

a displacement apparatus comprising a displacement chamber including a displacement element configured to be displaced therein and delimit a displacement volume inside the displacement chamber;

a connecting channel configured to connect the displacement volume to an opening in the at least one seat;

a drive apparatus coupled to the displacement element and configured to displace the displacement element in the displacement chamber;

an upper stop and a stop element each connected to the drive apparatus and configured to limit the displacement of the displacement element in the displacement chamber;

an overstroke apparatus comprising a lower stop and configured such that the stop element displaces the lower stop downwards when the stop element presses against the lower stop, wherein the downward displacement of the lower stop is limited to a first overstroke;

a displaceable overstroke limiting element configured to enable the displacement of the lower stop downwards by the first overstroke in a release position and limit said displacement to a second overstroke that is shorter than the first overstroke in a blocking position; and a switching apparatus connected to the overstroke limiting element in order to displace the overstroke limiting element into one of: (i) the release position for forward pipetting; and (ii) into the blocking position for reverse pipetting.

2. The air cushion pipette according to claim 1, wherein the drive apparatus comprises an operating button configured to actuate the drive apparatus.

3. The air cushion pipette according to claim 2, wherein the displaceable overstroke limiting element comprises a slider configured to be guided in a guide in the operating button and configured to be displaced in the guide from a release position.

4. The air cushion pipette according to claim 2, wherein the displaceable overstroke limiting element comprises a slider configured to be guided in a stationary guide and configured to be displaced in the guide from a release position, in which the displaceable overstroke limiting element does not project outwards from the guide, into a blocking position that projects outwards at least in part from the guide, in a displacement path of one of the (i) the operating button, (ii) stroke rod, and (iii) overstroke apparatus.

5. The air cushion pipette according to claim 4, wherein the switching apparatus comprises an operating element or tool engagement portion formed on the slider.

6. The air cushion pipette according to claim 1, wherein the drive apparatus comprises a stroke rod coupled to the displacement element at the lower end and configured to be displaced in a longitudinal direction, wherein the stop element is positioned on an outer periphery, and wherein an operating button is connected to the upper end of the stroke rod and configured to displace the displacement element in the displacement chamber.

7. The air cushion pipette according to claim 6, wherein the stroke rod is guided through a central spindle bore of a threaded spindle that is screwably held in a spindle nut and comprises the upper stop for the stop element on the lower end face.

8. The air cushion pipette according to claim 6, wherein the stop element is at least one projection on a periphery of the stroke rod.

9. The air cushion pipette according to claim 1, further comprising a return spring configured to load the drive apparatus in a direction of contact of the stop element on the upper stop.

10. The air cushion pipette according to claim 1, further comprising one of (i) a housing, (ii) a frame, (iii) a chassis, and (iv) a support structure configured to to hold the components of the pipette.

11. The air cushion pipette according to claim 1, wherein the air cushion pipette is one of (i) a handheld pipette, (ii) an automatic pipetting machine, and (iii) a pipetting device integrated in an automatic laboratory machine.

12. The air cushion pipette according to claim 11, wherein the air cushion pipette is one of (i) a mechanically driven handheld pipette, (ii) an electrically driven handheld pipette, and (iii) a hybrid mechanically and electrically driven handheld pipette.

13. The air cushion pipette according to claim 1, wherein the air cushion pipette is one of a (i) a single-channel pipette and (ii) a multichannel pipette.

14. An air cushion pipette comprising:

at least one seat configured to releasably hold a pipette tip;

a displacement apparatus comprising a displacement chamber including a displacement element configured to be displaced therein and delimit a displacement volume inside the displacement chamber;

a connecting channel configured to connect the displacement volume to an opening in the at least one seat;

a drive apparatus coupled to the displacement element and configured to displace the displacement element in the displacement chamber, wherein the drive apparatus comprises an electric motor and a transmission coupling the electric motor to the displacement element;

an electronic control apparatus connected to the electric motor and configured to control the electric motor such that, in a forward pipetting mode, the displacement element is displaced from an upper end position into a lower end position, from the lower end position into the upper end position, and from the upper end position into a first overstroke position arranged deeper than the lower end position by a first overstroke and, in a reverse pipetting mode, the displacement element is displaced from the upper end position into a second overstroke position that is arranged deeper than the lower end position by a second overstroke that is shorter than the first overstroke, from the second overstroke position into the upper end position, and from the upper end position into the lower end position; and a switching apparatus connected to the electronic control apparatus and configured to switch between the forward pipetting mode and the reverse pipetting mode.

15. The air cushion pipette according to claim 14, wherein the switching apparatus comprises one of (i) an electrical switch, (ii) a pushbutton, and (iii) an input device for setting a mode of operation.

* * * * *